United States Patent [19]

Kühnel

[11] Patent Number: 4,466,282
[45] Date of Patent: Aug. 21, 1984

[54] DEVICE FOR ELECTRICALLY MONITORING THE LEVEL OF A LIQUID PRESENT IN A CONTAINER

[75] Inventor: Frank Kühnel, Eschborn, Fed. Rep. of Germany

[73] Assignee: VDO Adolf Schindling AG, Frankfurt am Main, Fed. Rep. of Germany

[21] Appl. No.: 406,808

[22] Filed: Aug. 10, 1982

[30] Foreign Application Priority Data

Aug. 10, 1982 [DE] Fed. Rep. of Germany ....... 3133421

[51] Int. Cl.³ ............................................. G01F 23/00
[52] U.S. Cl. ................................... 73/295; 73/304 R
[58] Field of Search ............. 73/295, 304 R; 340/620; 338/38, 80; 374/142

[56] References Cited

U.S. PATENT DOCUMENTS

4,036,053  7/1977  Jenkins ............................... 73/295 X
4,283,719  8/1981  Williams .............................. 340/620
4,425,795  1/1984  Albrecht ................................ 73/295

Primary Examiner—Gerald Goldberg
Assistant Examiner—Vincent P. Kovalick
Attorney, Agent, or Firm—Martin A. Farber

[57] ABSTRACT

In a device for electrically monitoring the level of a liquid present in a container, a plurality of temperature-dependent resistance probes ($n-1$, $n$, $n+1$) are arranged at different heights in the container, they being adapted to be connected one after the other to a source of constant current (5) under the control of a program control device. For the evaluation of the voltage at one resistance probe (for example $n+1$) connected at the time to the source of constant current (5), a differentiator (6) is provided as well as a comparator (7), which is arranged behind the former and is and acted on by a threshold voltage and is connected to circuitry for forming a display signal. The circuitry comprises counter (4, 19) which counts the number of resistance probes ($n-1$, $n$, $n+1$) whose voltage differential is above the threshold voltage after connection to the source of constant current (5).

14 Claims, 4 Drawing Figures

DEVICE FOR ELECTRICALLY MONITORING THE LEVEL OF A LIQUID PRESENT IN A CONTAINER

The present invention relates to a device for electrically monitoring the level of a liquid present in a container, having a plurality of temperature-dependent resistance probes which are arranged at different heights in the container and are adapted to be connected one after the other to a source of constant current under the control of a program control device, with means evaluating the voltage drops across them and means for forming a display signal from the different voltages of the resistance probe.

This device falls within the class of so-called electrothermal level indicators which are based on the principle that the level of the liquid present in a container can be measured by measuring the change in the resistance of a resistance probe of positive temperature coefficient as a function of the temperature which the resistance probe assumes upon the passage of a defined current through it. If the resistance probe is developed as a resistance wire which is clamped vertically in the container, in accordance with one simple embodiment of this principle (West German Application OS No. 27 40 289), then the average temperature of the resistance probe depends on what portion of its total length is immersed in the liquid since the immersed portion is more strongly cooled than the portion which is present in the air. The total resistance is thus a function of the level of the liquid. In order to make the result of the measurement more independent of variations in the surrounding temperature, the average resistance which the resistance probe assumes after a certain period of passage of the current relates to an average resistance value at an initial time at which the probe was still not heated. Fundamental errors are, however, possible, in case of changes in the properties of the liquid to be measured, particularly in case of a change in its thermal conductivity, which can for instance occur as a result of different admixtures of methanol to the gasoline. Furthermore, errors in measurement are produced by non-homogeneous heating of the resistance probe the uniform heating of which is interfered with in particular at the points of contact and clamping.

In order to avoid these errors, means for electrothermal monitoring of the level are known which, instead of using a resistance probe which covers the entire measurement range within the container, divide said measurement range by using individual short resistance probes which are arranged horizontally one above the other at staggered heights corresponding to given heights of level. By successive heating of these resistance probes by a constant current and evaluation of the voltage drops on them, it is determined whether the corresponding resistance probe is or is not immersed in the liquid. This evaluation of one of two possible conditions of the corresponding resistance probes is practically independent of the properties of the liquid to be measured.

In order to evaluate whether staggered resistance probes are immersed or not, it is possible, specifically starting from the lowermost resistance probe, to measure the voltages of each two resistance probes arranged one above the other. As soon as the voltage difference exceeds a given amount because the upper resistance probe has a greater resistance than the lower resistance probe, whose heat is led away better by the liquid, the actual level is then between these two resistance probes. This evaluation of the voltage drops over the resistance probes has the disadvantage, however, that the voltage differences caused by differences in resistance of the resistance probes can easily be of the same order of magnitude as the measurement effect if the resistance probes have not been carefully balanced. This balancing process is time consuming, to say the least.

Another known method of evaluating the voltage drops over the staggered resistance probes consists again of comparing the initial voltage with the measurement voltage at each individual resistance probe which is fed with the source of constant current. The initial voltage and the measurement voltage are evaluated in comparators which determine whether the corresponding resistance probe is immersed in the liquid or not. Depending on the result of the comparison, a pre-determined signal which corresponds to the height of the uppermost immersed resistance probe immersed is given off. This device is, however, particularly expensive due to the comparators required in order to form the pre-determined signal. The expense of these incrementally acting monitoring devices becomes greater the smaller the increments which are selected, i.e. the greater the number of staggered resistance probes whose voltages are to be evaluated.

As compromise, there is therefore also known a device for electrically monitoring the level which is constructed with only a relatively few measurement probes, arranged vertically or obliquely in the container. These measurement probes are furthermore attached by means set forth in the introductory paragraph, one after the other to the source of constant voltage and are connected with means for evaluating the voltage drop over them and for forming the display signal. Specifically, the evaluation takes place in the manner that the number of immersed resistance probes is determined by a yes/no evaluation and that, in addition, an evaluation is made as to over what length the next higher resistance probe dips into the liquid. The expense for this device is, however, considerable since it requires a comparator forming a voltage value corresponding to the number of resistance probes immersed as well as detection and holding-circuit arrangements for the detection and storing of the initial voltage and of the measured voltage of the resistance probe connected at the time to the source of constant current. From the difference between the initial voltage and the measured voltage which are stored in these detecting and holding-circuit arrangements, a sum with the voltage of the comparator is formed after transformation of the voltage. If a digital output signal is to be produced, this voltage must in its turn be converted by an analog-digital converter.

The object of the present invention is so to develop a device for electrically monitoring the level of a liquid present in a container of the type mentioned at the start hereof in which only the number of resistance probes immersed is determined, that, while using inexpensive means, an exact balancing of the resistance values of the resistance probes is not necessary, so that the detectable spacing between levels can be selected relatively narrowly This object is achieved by a development of the device which is characterized by the fact that the means for evaluating the voltage at the resistance probe (for instance n+1) connected to the source of constant current (5) comprise a differentiator (6) as well as a comparator (7) arranged behind the differentiator and acted on by a threshold voltage, and that the means connected with the comparator for the formation of the display signal comprises a counter (4 in FIG. 2; 19 in FIG. 3) which counts the number of resistance probes whose voltage differential is above the threshold voltage after connection to the source of constant current.

In accordance with the invention, therefore, in order to determine whether a resistance probe is or is not immersed, the voltage on this probe is not continuously differentiated as a function of time and this differentiated voltage evaluated. The shape of the curve of this differentiated voltage depends primarily on the heating of the resistance probe since the temperature of the immersed resistance probe changes only slightly while that of the non-immersed resistance probe changes greatly, particularly so at the start of the connection of the resistance probe. The differentiated voltages which can be derived from the immersed and non-immersed resistance probes differ so greatly that dispersions in the resistance of the resistance probes can be neglected. The peaks of the differentiated voltages—possibly after suppression of the connect and disconnect flanks—can be evaluated by comparison with a reference voltage or threshold. The output signal of the comparator then determines up to what resistance probe the number of resistance probes connected in succession to the source of constant current during a measurement cycle is counted. The result of the count then corresponds in quantified or digitalized form to the level of the liquid in the container.

In order to avoid errors due to the relatively high steep leading edge or transient of the differentiated voltage pulse of a resistance probe which is connected to the source of constant current which exceed the threshold of the comparator, means are advantageously provided by which the evaluation of the differentiated voltage takes place only after the leading edge in the manner that the means for evaluation of the differentiated voltage of the resistance probe (for instance n+1) connected at the time to the source of constant current (5) which are arranged behind the differentiator (6) can be activated only after the passage of the first positive leading edge formed by the differentiator upon the connecting of the resistance probe.

As an alternative, disturbances by the such leading edges which exceed the threshold can be avoided in the manner that only negative excursions in the voltage are produced. This can be effected in simple manner by dimensioning the resistance probes with increasingly smaller resistance from the bottom to the top. In this way, upon the connecting of the next higher resistance probe, a negative leading edge is first formed which rises into the positive region. Before the connecting of the lowermost resistance probe an additional resistance whose voltage is not evaluated is connected to the source of constant current so that a negative edge is also produced upon the connection of the lowermost resistance probe. The staggering of the resistances of the resistance probes is advisedly effected in such a manner that the resistances of measurement branches (at 14) which are connected to the differentiator (6), and each of which has a resistance probe (for instance n) and a feed to same through the feed resistor, are selected in the foregoing staggered manner.

In accordance with the invention, furthermore, a resistor (15) which can be connected in a measurement cycle before the lowermost resistance probe (n−14) is arranged outside the container.

If resistance staggering is difficult to effect, particularly in the case of a large number of resistance probes, positive edges can be avoided by connecting an additional resistor into a feed line to the resistor connected at the time to the source of constant current, shortly before the switching to the next resistance probe. The positive edge generated during this connecting is suppressed before its evaluation.

Suitable embodiments of the device for the program control are characterized by the fact that the means for program control for sequential connection of the resistance probes (n−1 to n−1) up to the first non-immersed resistance probe, during a measurement cycle, each comprises a discriminator (9) which is connected behind the comparator (7) and the one output of which, which is activated upon a smaller differentiated voltage than the threshold voltage, is connected to a counter input (10) of a counter (4) with probe control device and the second output of which, which is activated upon a larger differentiated voltage than the threshold voltage, is coupled with a reset input (11) of the counter (4).

Furthermore, in accordance with the invention, a counting input and a reset input of the counter (19 in FIG. 3) are connected, for the formation of the indication signal, also with the program control means (22), while the counting outputs of the counter (19) are connected via an intermediate storage (20) with a shift register (21) from which the result of the counting can be called for display.

With the above and other objects and advantages in view, the present invention will become more clearly understood in connection with the detailed description of a preferred embodiment, when considered with the accompanying drawings, of which.

Figure 1:
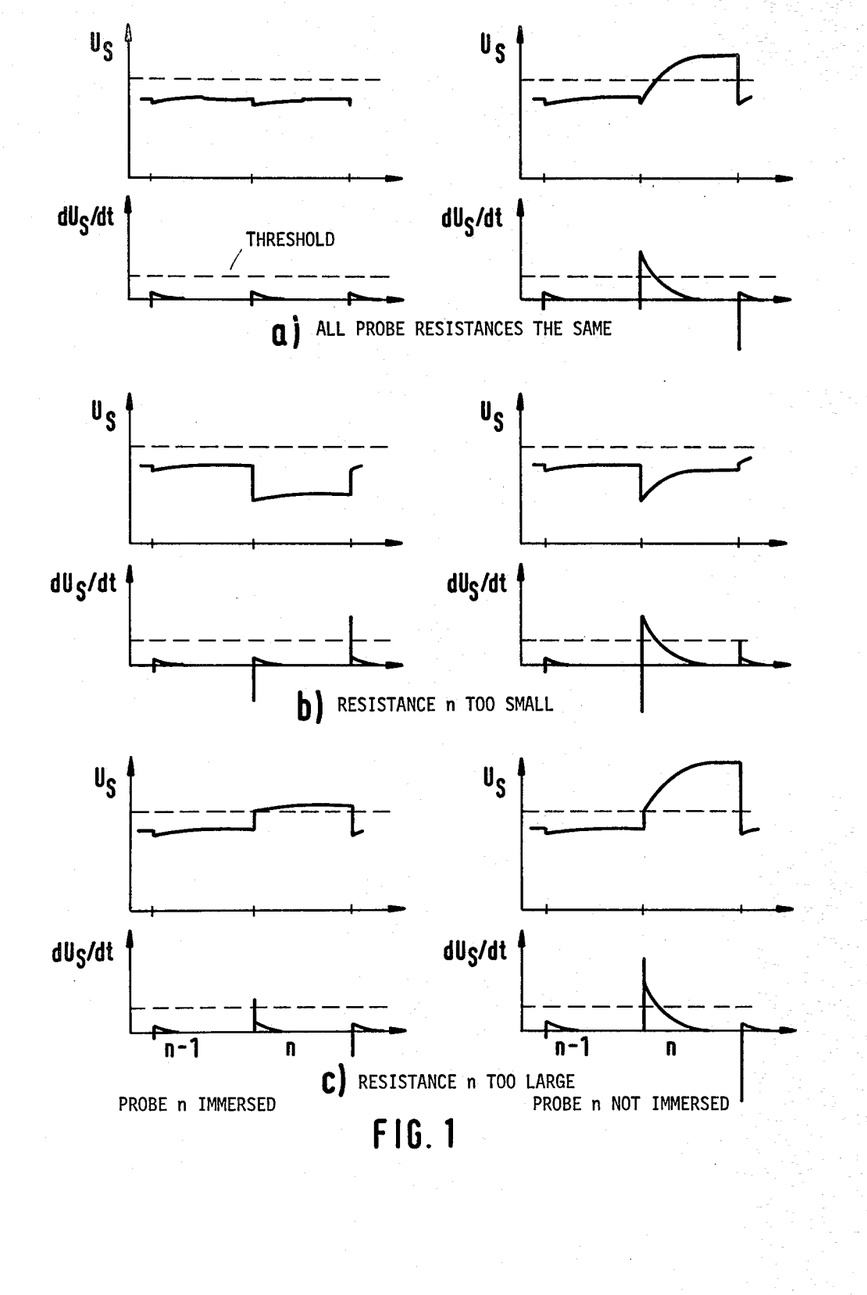
FIG. 1 shows the variations with time of the voltage drops $U_S$ on the successively connected resistance probes, as well as their differentiated voltages $dU_s/dt$.

FIG. 1a shows the variations in voltage in the event that the resistances of all the resistance probes n−1, n, which can be connected one after the other, are the same; FIG. 1b shows the variations of the voltage in the event that the resistance of the resistance probe n is less than the resistance of the resistance probe n−1; finally, FIG. 1c shows the case that the resistance of the probe n is greater than the resistance of the probe n−1. Furthermore, all voltage curves in the left-hand column of FIG. 1 show the case in which the resistance probe n is immersed while the right-hand column shows the voltage curves for the non-immersed resistance probe n.

From FIG. 1a it can be seen that with an approximately equal dimensioning of the resistance probes the voltage $U_S$ remains approximately constant upon the switching of the source of constant current from one probe to the next if all resistance probes are immersed. Accordingly, the differentiated probe voltages form only very small pulses which do not reach a threshold of the comparator. On the other hand, if the resistance probe n is not immersed—see right-hand part of FIG. 1a—then the voltage drop at the resistance probe n increases in accordance with an equalization function and the corresponding differentiated pulse $dU_S/dt$ exceeds the threshold. This pulse can be used, in a manner still to be shown, in order to count the number of resistance probes immersed up to this resistance probe n.

FIG. 1b shows the variations of the voltage when the resistance probe n has a smaller resistance than the previously and subsequently connected resistance probes. Upon the connection of the immersed resistance probe a first pulse edge of the differentiated voltage $dU_S/dt$ occurs which commences at more negative values than in the case of a balanced resistance probe, which, however, does not interfere with the evaluation since in this case also the threshold is not reached. The switching to the next resistance probe, which again has a normal resistance value, is problematical since here the differentiated voltage of the probe produces an initially high positive excursion which can simulate an unimmersed condition of this resistance probe. This excursion can be avoided, for instance, in the manner that the next resistor of the resistance probe n+1 again has a smaller resistance than the resistance probe n. In the right-hand part of FIG. 1b it is shown how, with a relatively small immersed of the resistance probe n, the differentiated voltage $dU_S/dt$ can definitely exceed the threshold so that here a proper evaluation of the unimmersed resistance probe is possible.

From FIG. 1c it can be seen that with all the probes immersed, again a relatively large positive connection excursion of the differentiated voltage $dU_S/dt$ is produced when the resistance probe n has a higher resistance than the preceding resistance probe n−1. This positive excursion may reach and exceed the threshold and thus again falsely simulate a non-immersed condition of the probe if no suitable countermeasures are taken upon the evaluation of this pulse.

One possibility for avoiding false countings of the unimmersed resistance probe n in FIG. 1c or of the resistance probe n+1 in FIG. 1b is to have the evaluation of the differentiated voltage $dU_S/dt$ start only after disappearance of the positive leading edges in order to evaluate the course of the pulse occurring by differentiation of the voltage at the resistance probe which varies in accordance with an equalization function.

A second possibility of avoiding false measurements consists in continuously reducing from the bottom to the top, within the container, the resistances of the successively connected probes which are connected to the source of constant current so that the leading edges are substantially negative; see FIG. 1b, voltage variations of the differentiated voltages $dU_S/dt$ upon connection of the resistance probe n.

In the above method of avoiding large positive excursion it is presupposed that the increase in resistance of successively connected resistance probes is greater than the maximum expected dispersion of the resistances. Furthermore in front of the first resistance probe a resistor, whose voltage is not evaluated, is connected so as to produce a negative leading edge even upon the connection of the first resistance probe.

If resistance staggering with successively decreasing resistances is not possible, then shortly before the switching to the next resistance probe a higher resistance can be connected in advance into the measurement branch of the resistance probe which is still connected and the positive edge produced in this way masked. Upon the connecting of the next resistance probe n, there is then again obtained a voltage curve as though the resistance of the probe n were dimensioned smaller than that of the preceding resistance probe.

Figure 2:
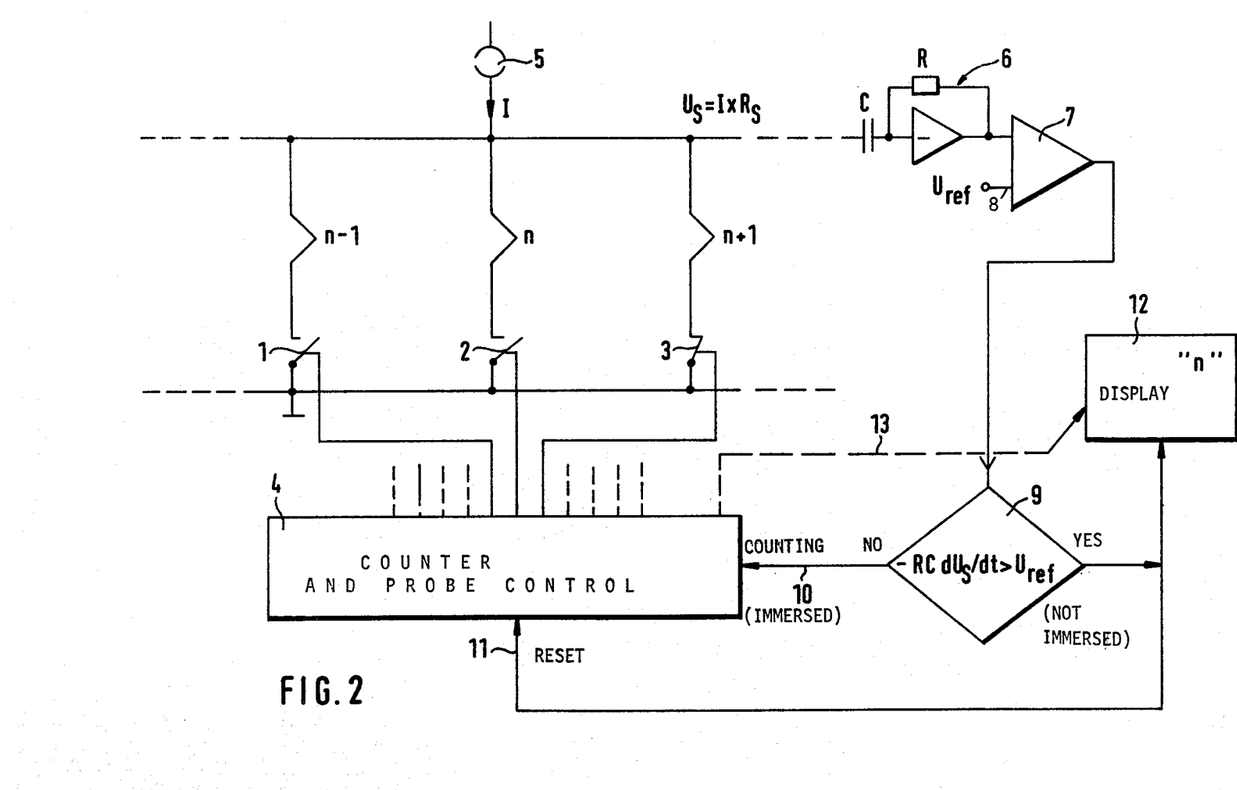
FIG. 2 is a block diagram of the device for the electric monitoring of the level, in a first embodiment.

FIG. 2 shows diagrammatically a circuit arrangement which indicates the means which effect the switching of the resistance probes and the evaluation of the voltage drops on them.

In FIG. 2, n−1, n and n+1 are resistance probes which, together with other resistance probes, are staggered from the bottom to the top within a container, not shown. A respective one of the resistance probes is connected in the sequence n−1, n, n+1, by switches 1, 2, 3, controlled by a counter with probe control 4, to a source of constant current 5. The voltage which drops off on each connected resistance probe is differentiated by a differentiator 6 and fed to a comparator 7 whose one input 8 is acted on by a reference voltage forming a threshold. The output signal of the comparator is evaluated in a discriminator 9 which is connected to the output of the comparator. One output of the discriminator leads to a counting input 10 of the counter and probe control 4 while a second output of the discriminator leads to a reset input 11 and to a display device 12. The display device receives a display signal from the counter and probe control 4 via the dashed line 13.

The device of FIG. 2 operates substantially in the manner that the resistance probes are connected one by one in succession with the source of constant current 5. Thus in FIG. 2 the resistance probe n+1 is connected by the switch 3. The voltage drop on the resistance probe n+1 is differentiated in the differentiator 6 and compared in the comparator 7 with the reference voltage 8 which represents a threshold. When the discriminator 9 notes that the differentiated voltage of the resistance probe n+1 does not reach the threshold corresponding to the reference voltage at the input 8 of the comparator, a counting pulse is introduced into the counter and probe control 4 and the next resistance probe, not shown in the drawing, is connected to the source of constant current 5 in the place of the resistance probe n+1. This process is repeated until the first unimmersed probe in a measurement cycle is reached. In this case the differentiated voltage dropping off at the resistance probe forms too large a voltage pulse so that the threshold in the comparator 7 is exceeded. The discriminator then produces a signal which activates the display device 12 so that it indicates the number of immersed probes counted in a measurement cycle up to the first unimmersed probe, corresponding to the display signal which is taken via the line 13 from the counter with probe control 4. Furthermore, a reset signal is fed from the discriminator into the reset input 11 of the counter with probe control 4, as a result of which the counter is reset. Thereupon a new measurement cycle can start, in which the lowest resistance probe (not shown) is connected.

Figure 3:
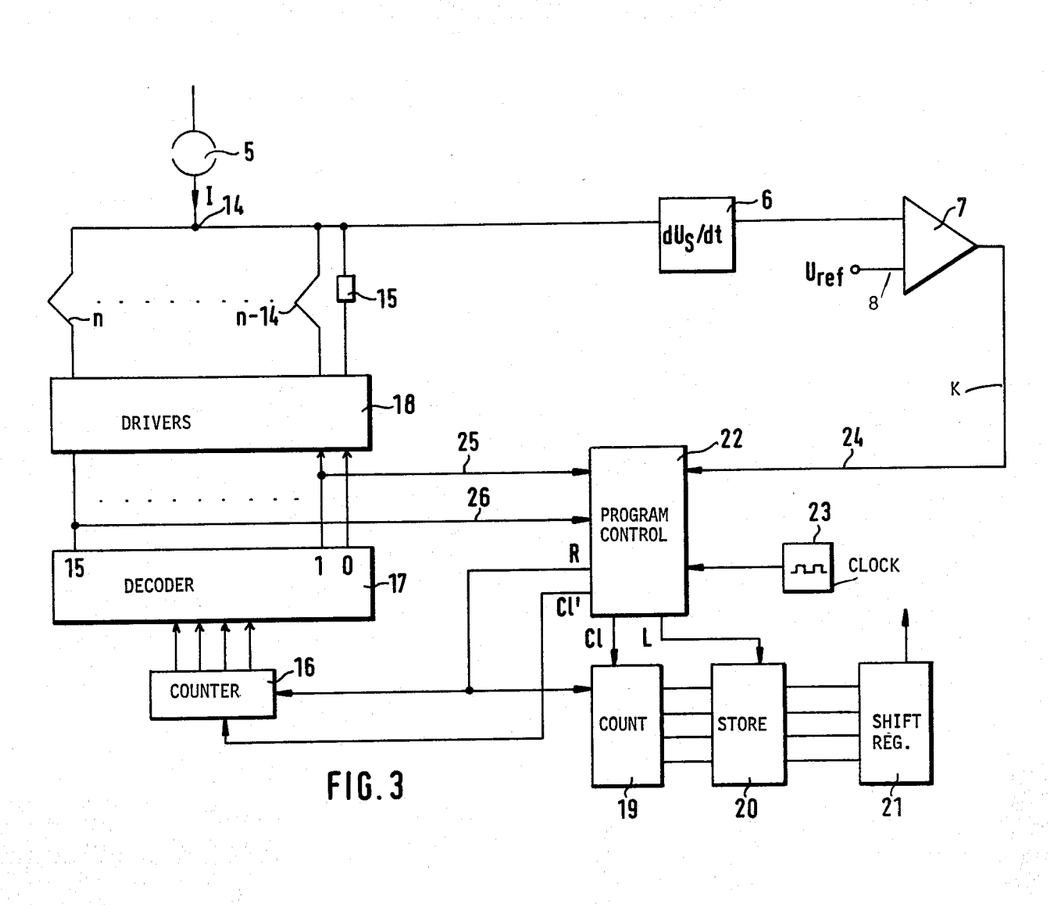
FIG. 3 is a block diagram of the device for the electric monitoring of the level, in a second embodiment.

FIG. 3 shows a block diagram for the device for measuring the level with sixteen level steps.

For this purpose, fifteen resistance probes n to n−14 are arranged staggered at different levels in the container. The resistance probes can be formed on a sensor, as nickel conductor paths on a polycarbonate foil such as Kapton.

Each resistance probe forms a measurement branch between a reference potential line common to the differentiator 6 and the comparator 7—see also FIG. 2—and a common connection point 14 of the source of constant current 5 and the differentiator 6, the resistance of which branch can be adjusted by the feed line to the resistance probe. The resistances of the measurement branches containing the resistance probes n−14 to n are staggered in decreasing value. An additional resistor 15 associated with the level zero is arranged as fixed resistor outside the container; its resistance is greater than that of the first measurement branch containing the resistance probe n−14.

FIG. 3 furthermore shows how the measurement branches with the probes n−14 to n and the resistor 15 are connected, in succession, controlled by a counter 16, via a decoder 17 and driver stages 18. The decoder and the driver form part of the probe control arrangement which belongs to the counter 4 in FIG. 2. For the formation of the display signal the counter 19 is provided, it being connected via an intermediate storage 20 with a shift register 21 for serial inquiry.

The counter 16, the counter 19 and the intermediate storage 20 are controlled by a program control device 22 which is connected with a clock generator 23.

The program control device receives control signals via a line 24 from the comparator 7 and furthermore via lines 25, 26 from the decoder 17. The measurement process of the arrangement of FIG. 3 takes place in the following manner: Upon the connecting of the device the counters are set to "7" so that when the container is full, not all the probes need be measured in succession until the corresponding display signal is reached. The maximum time until the formation of the first display signal is thus reduced by one-half as compared with an ordinary reset effected to a value of 0.

The probes are now connected to the source of constant current via the driver 18 and the decoder 17 under the control of the counter 16. For this purpose the counter 16 is incremented by a clock signal C1′ which is derived from the clock generator 23. If the resistance probe connected at the time is immersed, then the counter 19 also receives a counting pulse from the program control device 22 depending on the signal present on the line 24. If the resistance probe connected at the time is recognized to be non-immersed by the comparator 7 and the program control device 22, then further counting of a counting pulse C1 in the counter 19 is blocked. The counting result in the counter 19 is then stored in the intermediate storage 20 for which purpose the data transfer is controlled by a signal L by the program control means 22. From the intermediate storage the counting result passes into the shift register 21 from which it can be called. Now both counters 16 and 19 are reset by the reset signal R and a new measurement cycle can start, commencing with the connection of the resistor 15 and then of the resistance probe n−14.

In the device 22 there is provided a monoflop which, if the first resistance probe n−14 is not immersed, permits a pulse delay to become active so that the resistance probe can cool before it is again connected in the brief measurement cycle during which the source of constant current is to be connected only to the resistor 15 and the resistance probe n−14. Otherwise the change in resistance in the resistance probe n−14 would be so small that an immersed condition would be signalled.

Figure 4:
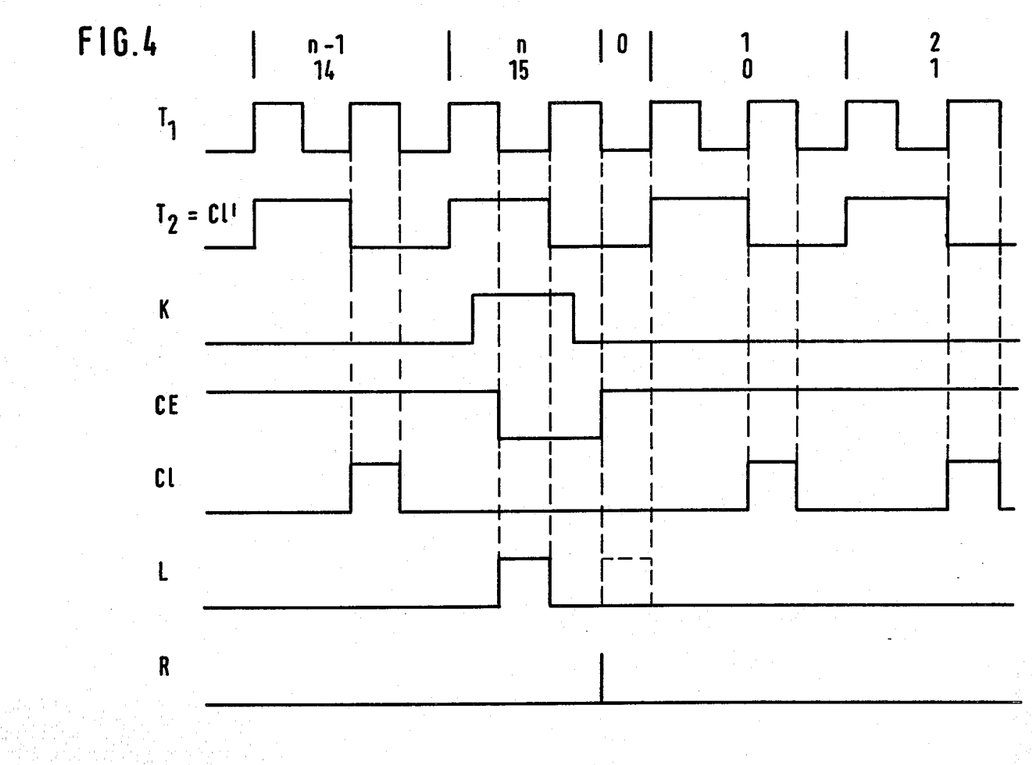
FIG. 4 is a pulse diagram of the signals occurring in the device of FIG. 3.

From FIG. 4 there can be noted the change with time of different signals in the circuit arrangement of FIG. 3, commencing with the connecting of the next to the last resistance probe n−1. In the uppermost pulse train $T_1$ there are shown the clock generator pulses from which the clock signal $T_2$ is formed by frequency halving. The clock signal $T_2$ is identical with the signal C1′ for the control of the counter 16. From the pulse train C1 it is clear that after the connecting of the resistance probe n−1 a counting pulse is fed into the counter 19 since the comparator gives off a signal K which represents an immersed condition.

Upon the connecting of the resistance probe n the unimmersed condition is signalled by a change of the signal K on the line 24. Thereupon, the forwarding of a counting pulse to the counter 19 is blocked by the pulse train CE which is produced in the second quarter of the clock signal $T_2$. This signal CE increases the assurance against noise since it indicates the actual measurement time. Furthermore, this signal is provisionally stored in a flip-flop so that a change in state of the comparator by disturbance signals is without effect. As a function of the signal CE, the signal L is formed at suitable times of the clock signals $T_1$ and $T_2$, said signal controlling the data transfer from the counter 19 into the intermediate storage 20. This signal L is formed furthermore independently of the signal CE at the time when the last resistance probe n was connected and it signals that the container is full. Finally, the reset signal R is produced, which resets the counters 16 and 19.

I claim:

1. In a device for electrically monitoring the level of a liquid present in a container, having a plurality of temperature-dependent resistance probes which are arranged at different heights in the container and which are to be connected one after the other to a source of constant current under the control of a program control device, with means for evaluating the voltage drop over said resistance probes and means for forming the display signal from the different voltages of the resistance probe, the improvement wherein said means for evaluating the voltage drop across the resistance probes is connected to the source of constant current and comprises a differentiator as well as a comparator, said comparator being connected behind the differentiator and acted on by a threshold voltage, and said means for forming the display signal is connected with said comparator and comprises a counter which counts signals of the comparator corresponding to a count of the number of resistance probes whose voltage differential is above the threshold voltage after connection to the source of constant current.

2. In a device for electrically monitoring the level of a liquid present in a container, having a plurality of temperature-dependent resistance probes which are arranged at different heights in the container and which are to be connected one after the other to a source of constant current under the control of a program control device, with means for evaluating the voltage drop over said resistance probes and means for forming the display signal from the different voltages of the resistance probe, the improvement wherein said means for evaluating the voltage drop across the resistance probes is connected to the source of constant current and comprises a differentiator as well as a comparator, said comparator being connected behind the differentiator and acted on by a threshold voltage, said means for forming the display signal is connected with said comparator and comprises a counter which counts signals of the comparator corresponding to a count of the number of resistance probes whose voltage differential is above the threshold voltage after connection to the source of constant current, and the comparator for evaluation of the differentiated voltage of the resistance probe connected at the time to the source of constant current and which is arranged behind the differentiator can be activated only after the passage of the first positive leading edge of a pulse formed by the differentiator upon the connecting of the resistance probe.

3. The device according to claim 2, further comprising a plurality of measurement branches connected to the differentiator and a feed resistor, the resistances of said measurement branches, each of which has a resistance probe and a feed to same through the feed resistor, are provided with values of resistance which vary in staggered manner.

4. The device according to claim 2, further comprising:

a counter with a probe control means for switching current of said current source into said probes;

program control means for driving the probe control means for the sequential connection of the resistance probes up to the first non-immersed resistance probe during a measurement cycle; and a discriminator which is connected behind the comparator, one output of the discriminator being activated upon a smaller differentiated voltage than the threshold voltage and being connected to a counter input of the counter, and the second output of the discriminator being activated upon a larger differentiated voltage than the threshold voltage and being coupled with a reset input of the counter.

5. The device according to claim 4, further comprising a shift register, a second counter, and means for transferring a count of said second counter to said shift register, a counting input and a reset input of the second counter being connected, for the formation of the display signal, with the program control means while the counting outputs of the second counter are connected via said intermediate storage to said shift register from which the result of the counting can be called for display.

6. In a device for electrically monitoring the level of a liquid present in a container, having a plurality of temperature-dependent resistance probes which are arranged at different heights in the container and which are to be connected one after the other to a source of constant current under the control of a program control device, with means for evaluating the voltage drop over said resistance probes and means for forming the display signal from the different voltages of the resistance probe, the improvement wherein said means for evaluating the voltage drop across the resistance probes is connected to the source of constant current and comprises a differentiator as well as a comparator, said comparator being connected behind the differentiator and acted on by a threshold voltage, said means for forming the display signal is connected with said comparator and comprises a counter which counts signals of the comparator corresponding to a count of the number of resistance probes whose voltage differential is above the threshold voltage after connection to the source of constant current, and the values of resistance of respective ones of the resistance probes vary with increasingly smaller resistance from the bottom to the top of the container.

7. The device according to claim 6, further comprising a plurality of measurement branches connected to the differentiator and a feed resistor, the resistances of said measurement branches, each of which has a resistance probe and a feed to same through the feed resistor, are provided with values of resistance which vary in staggered manner.

8. The device according to claim 6, further comprising a resistor connected in a measurement cycle before the lowermost of said resistance probes and being located outside the container.

9. The device according to claim 6, further comprising an additional resistor, said additional resistor being connected into a feed line to the resistor, connected at the time to the source of constant current, shortly before the switching to the next resistance probe.

10. The device according to claim 6, further comprising:

a counter with a probe control means for switching current of said current source into said probes;

program control means for driving the probe control means for the sequential connection of the resistance probes up to the first non-immersed resistance probe during a measurement cycle; and a discriminator which is connected behind the comparator, one output of the discriminator being activated upon a smaller differentiated voltage than the threshold voltage and being connected to a counter input of the counter, and the second output of the discriminator being activated upon a larger differentiated voltage than the threshold voltage and being coupled with a reset input of the counter.

11. The device according to claim 10, further comprising a shift register, a second counter, and means for transferring a count of said second counter to said shift register, a counting input and a reset input of the second counter being connected, for the formation of the display signal, with the program control means while the counting outputs of the second counter are connected via said intermediate storage to said shift register from which the result of the counting can be called for display.

12. In a device for electrically monitoring the level of a liquid present in a container, having a plurality of temperature-dependent resistance probes which are arranged at different heights in the container and which are to be connected one after the other to a source of constant current under the control of a program control device, with means for evaluating the voltage drop over said resistance probes and means for forming the display signal from the different voltages of the resistance probe, the improvement wherein said means for evaluating the voltage drop across the resistance probes is connected to the source of constant current and comprises a differentiator as well as a comparator, said comparator being connected behind the differentiator and acted on by a threshold voltage, said means for forming the display signal is connected with said comparator and comprises a counter which counts signals of the comparator corresponding to a count of the number of resistance probes whose voltage differential is above the threshold voltage after connection to the source of constant current, and an additional resistor, said additional resistor being connected into a feed line to the resistor, connected at the time to the source of constant current, shortly before the switching to the next resistance probe.

13. The device according to claim 12, further comprising:

a counter with a probe control means for switching current of said current source into said probes;

program control means for driving the probe control means for the sequential connection of the resistance probes up to the first non-immersed resistance probe during a measurement cycle and including a counter with probe control device, and a discriminator which is connected behind the comparator, one output of the discriminator being activated upon a smaller differentiated voltage than the threshold voltage and being connected to a counter input of the counter, and the second output of the discriminator being activated upon a larger differentiated voltage than the threshold voltage and being coupled with a reset input of the counter.

14. The device according to claim 13, further comprising a shift register, a second counter, and means for transferring a count of said second counter to said shift register, a counting input and a reset input of the second counter being connected, for the formation of the display signal, with the program control means while the counting outputs of the second counter are connected via said intermediate storage to said shift register from which the result of the counting can be called for display.

* * * * *